(12) United States Patent
Gao et al.

(10) Patent No.: US 10,841,558 B2
(45) Date of Patent: Nov. 17, 2020

(54) ALIGNING TWO IMAGES BY MATCHING THEIR FEATURE POINTS

(71) Applicants: Xinting Gao, Singapore (SG); Wenshou Chen, Shanghai (CN); Shan Xu, Singapore (SG); Yanfang Huang, Shanghai (CN); Guansong Liu, San Jose, CA (US); Lu Chang, Cupertino, CA (US)

(72) Inventors: Xinting Gao, Singapore (SG); Wenshou Chen, Shanghai (CN); Shan Xu, Singapore (SG); Yanfang Huang, Shanghai (CN); Guansong Liu, San Jose, CA (US); Lu Chang, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 78 days.

(21) Appl. No.: 15/817,043

(22) Filed: Nov. 17, 2017

(65) Prior Publication Data

US 2019/0158799 A1    May 23, 2019

(51) Int. Cl.
| | |
|---|---|
| *G06K 9/46* | (2006.01) |
| *H04N 5/262* | (2006.01) |
| *H04N 13/239* | (2018.01) |
| *H04N 13/00* | (2018.01) |
| *H04N 13/128* | (2018.01) |

(Continued)

(52) U.S. Cl.
CPC ....... *H04N 13/128* (2018.05); *G06K 9/00201* (2013.01); *G06K 9/4609* (2013.01); *G06K 9/6202* (2013.01); *H04N 5/23238* (2013.01); *H04N 5/23296* (2013.01); *H04N 5/2628* (2013.01); *H04N 13/106* (2018.05);

(Continued)

(58) Field of Classification Search
CPC .................................................. H04N 13/128
USPC ........................................................... 348/47
See application file for complete search history.

(56) References Cited

U.S. PATENT DOCUMENTS

| | | | |
|---|---|---|---|
| 2011/0196661 A1* | 8/2011 | Spicola | A01K 29/00 703/11 |
| 2012/0120202 A1* | 5/2012 | Yoon | H04N 13/239 348/49 |

(Continued)

OTHER PUBLICATIONS

Adrian Kaehler et al., Matching Method, In OpenCV 3.0, pp. 573-579.

*Primary Examiner* — Amir Shahnami

(57) ABSTRACT

A multiple camera imaging system comprises a first camera image sensor to obtain a first image of a scene and a second camera image sensor to obtain a second image. The system further comprises an image signal processor (ISP) to produce a first roughly-aligned image from the first image and a second roughly-aligned image from the second image. A feature point in the first roughly-aligned image is identified. A center of a search zone is created, which is a combination of the position of the feature point and an associated disparity value from the first and second roughly-aligned images. The search zone is created within the second roughly-aligned image. Candidate feature points are identified within the search zone, which is much smaller than the entire image. A best-matched feature point pair in the first roughly-aligned image and the second roughly-aligned image is then identified.

10 Claims, 6 Drawing Sheets

(51) Int. Cl.
  *H04N 5/232* (2006.01)
  *H04N 13/139* (2018.01)
  *G06K 9/00* (2006.01)
  *G06K 9/62* (2006.01)
  *H04N 13/106* (2018.01)

(52) U.S. Cl.
  CPC ......... *H04N 13/139* (2018.05); *H04N 13/239* (2018.05); *H04N 2013/0081* (2013.01)

(56) References Cited

U.S. PATENT DOCUMENTS

2014/0035909 A1* 2/2014 Abramoff ............... G06T 15/00
                                                    345/419
2014/0063188 A1* 3/2014 Smirnov ................. G06T 7/593
                                                    348/43
2016/0205381 A1* 7/2016 Macmillan ........... H04N 17/002
                                                    348/47
2018/0182117 A1* 6/2018 Goldentouch ....... H04N 13/207
2018/0376122 A1* 12/2018 Park ..................... H04N 13/128

\* cited by examiner

ALIGNING TWO IMAGES BY MATCHING THEIR FEATURE POINTS

TECHNICAL FIELD

This disclosure relates to image signal processing of a dual or multiple camera imaging system, which includes two or more cameras, with each camera taking its own image of the same scene from its own perspective vantage point. More particularly, this disclosure relates to aligning two images by matching the feature points of the image taken by one camera to the feature points of the image taken by another camera.

BACKGROUND INFORMATION

An array camera includes an array of individual cameras, and is alternatively referred to as a multiple camera imaging system. An example of such an imaging system is a dual camera system that is becoming a popular product feature in mobile phones. Typically, the individual cameras cooperate to provide imaging functionality that cannot be achieved by using only one camera by itself. For example, in stereo imaging, two individual cameras each takes an image of the same scene from two slightly different vantage points, thereby producing a depth perception functionality that is not achievable with a single camera alone. As another example, in dynamic zooming, the dual camera system includes a telephoto lens camera with a narrower but more focused field of view (FOV), and a wide FOV camera with a wider but less focused field of view. These two cameras are directed to each take an image of essentially the same scene, with the telephoto lens camera providing a more zoomed-in view of the scene. The pair of images captured by these two cameras may be processed and then combined to provide a range of zoom levels, thereby producing a dynamic zooming functionality. With only a single camera, such functionality would require a complex, active-type mechanical adjustment of a variable imaging objective.

The abovementioned dual camera system operations rely on proper combination or superposition of two images captured by two different cameras that are placed at slightly different positions, thus having slightly different perspective views of the same scene. Prior to image combination or superposition, geometrical corrections are applied to the captured images to rectify each image and to attempt to align them with each other. Conventionally, the requisite alignment process is based on comparing pixel values between individual images to find corresponding pixels. However, this alignment process is offline, meaning that it is done at a time when a real image is not being taken by the dual camera system, and usually takes place before the camera product is shipped to the customer. There are online residual errors that may cause misalignment when the dual camera system is being used to capture real images. Such residual errors cannot be corrected by an offline alignment process.

BRIEF DESCRIPTION OF THE DRAWINGS

Non-limiting and non-exhaustive examples of the invention are described with reference to the following figures, wherein like reference numerals refer to like parts throughout the various views unless otherwise specified.

Figure 1:
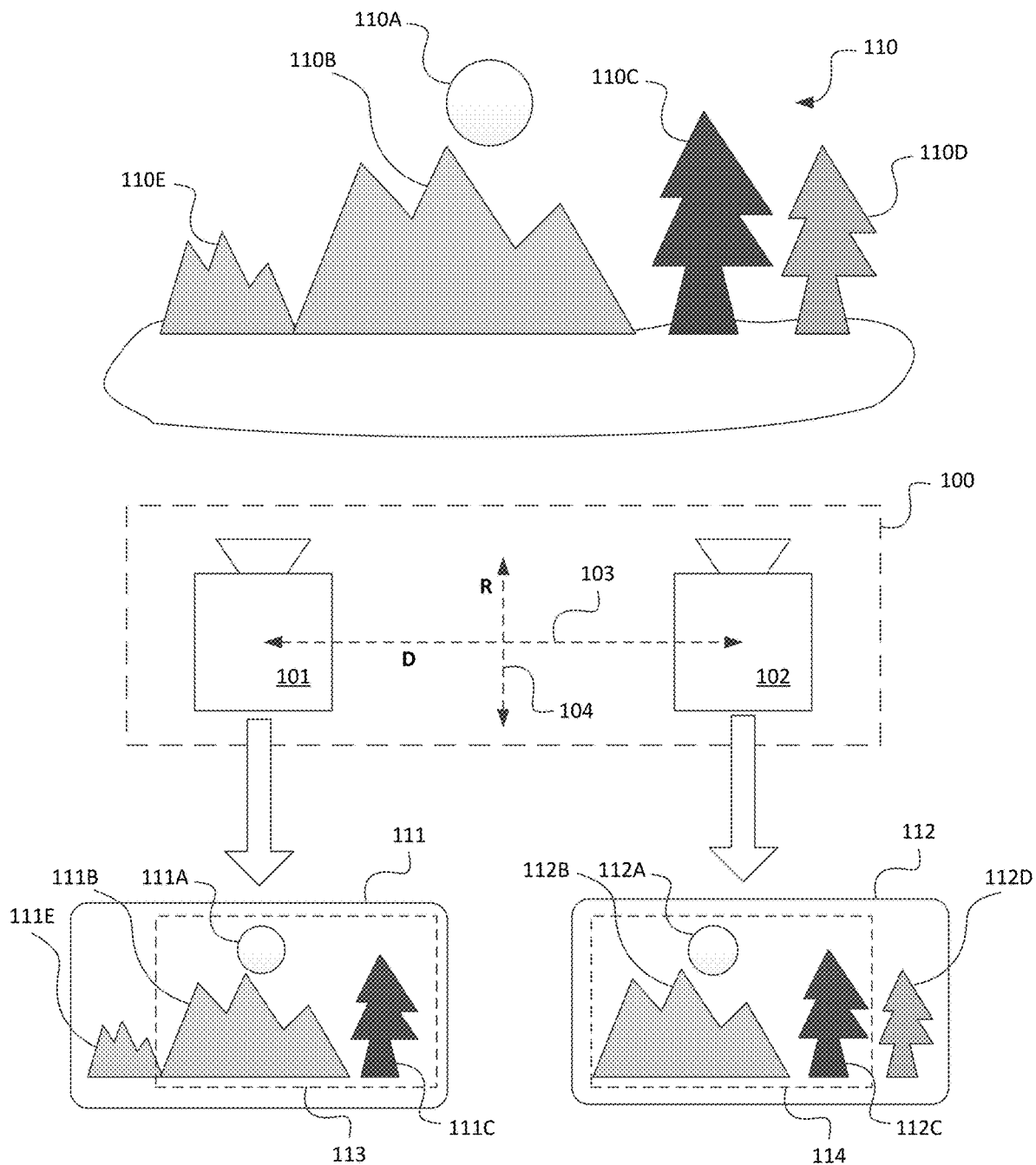
FIG. 1 is a schematic diagram showing a first camera sensor imaging a scene to produce a first image from a first perspective vantage point, and a second camera sensor imaging the same scene to produce a second image from a second perspective vantage point.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth to provide a thorough understanding of the examples. One skilled in the relevant art will recognize; however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "example" or "embodiment" means that a particular feature, structure, or characteristic described in connection with the example is included in at least one example of the present invention. Thus, the appearances of "example" or "embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise.

Multiple Camera Imaging System and Disparity Direction

Figure 6:
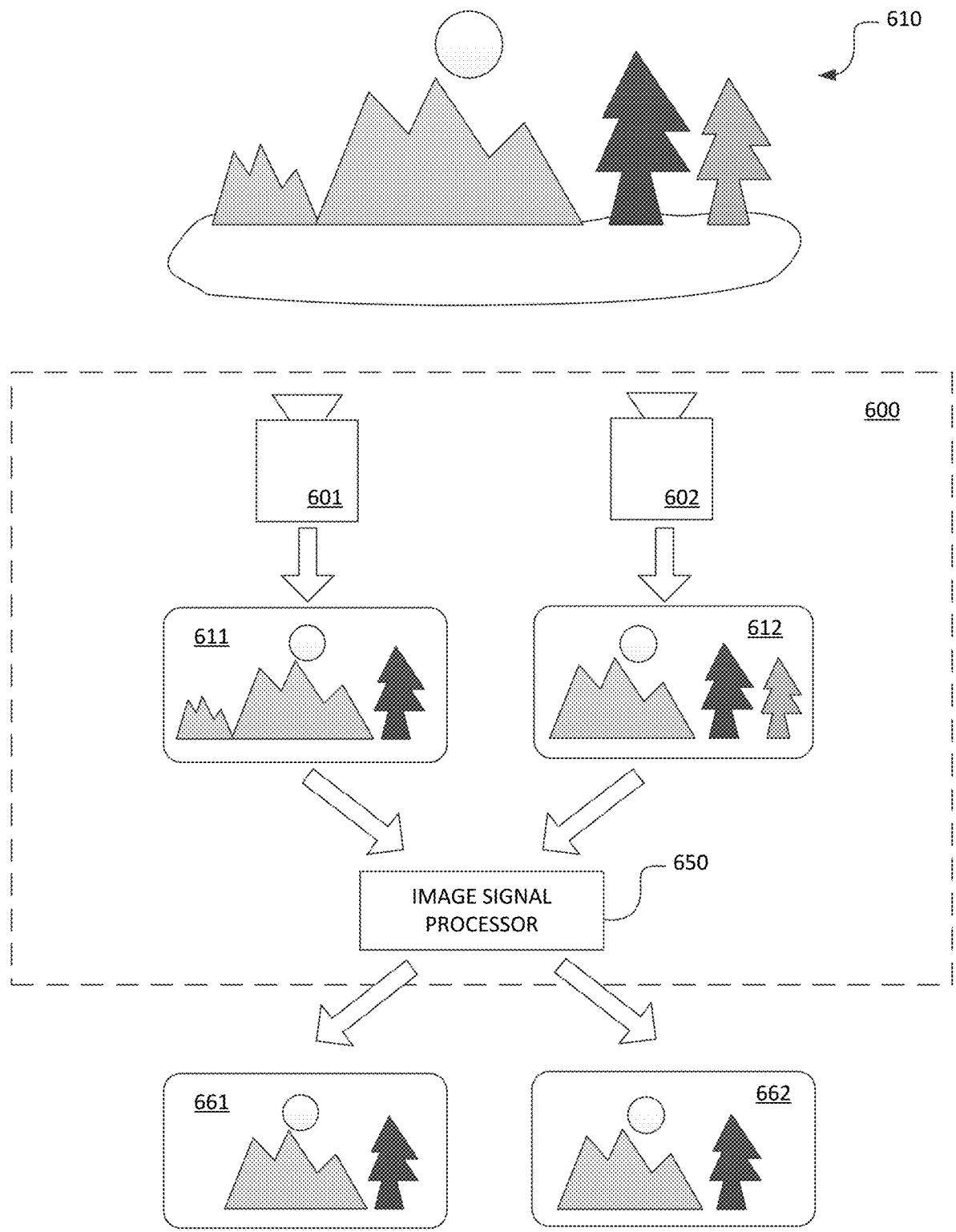
FIG. 6 is a schematic diagram showing a multiple camera imaging system that includes a first camera sensor to image a scene to produce a first image from a first perspective vantage point, a second camera sensor to image the same scene to produce a second image from a second perspective vantage point, and an image signal processor (ISP) to process and align the first and second images.

FIG. 6 is a schematic diagram showing a multiple camera imaging system 600 that includes a first camera (or camera sensor) 601, a second camera (or camera sensor) 602, and an image signal processor (ISP) 650. The imaging system 600 takes images of a scene 610. More specifically, the first camera 601 obtains a first image 611 of the scene 610 from a first vantage point (for example, the left side). The second camera 602 obtains a second image 612 of the same scene 610 from a second vantage point (for example, the right side). It is appreciated that the first image 611 and the second image 612 have different perspectives. Both images are conveyed to the ISP 650 to be processed, the operation of which may include some or all the steps of rough alignment (cropping, scaling, etc.), monotone conversion, further alignment, and other relevant image signal processing techniques. After processing, the imaging system 600 outputs a first processed image 661, and a second processed image 662 that is aligned (but not necessarily matched exactly) with the first processed image 661. These two processed images may then be used for various applications, such as depth perception, dynamic zooming, etc.

FIG. 1 is a diagram that shows more details of the aforementioned multiple camera imaging system, particularly the details relating to the relative spatial relationship of the two cameras therein. As shown in FIG. 1, a multiple camera imaging system 100 includes a first camera (or camera sensor) 101, and a second camera (or camera sensor) 102. In the present embodiment, the first and second cameras 101 and 102 appear to have the same intrinsic properties. It is appreciated that in another embodiment, the two cameras may have different intrinsic properties. For example, the first camera 101 may be a telephoto lens camera, whereas the second camera 102 may be a wide field-of-view (FOV) camera.

The first camera 101 produces a first image 111 of a scene 100 from a first perspective vantage point (for example, the left side). The second camera 102 produces a second image 112 of the same scene 100 from a second perspective vantage point (for example, the right side). It is appreciated that the first image 111 and the second image 112 have different perspectives. In addition, in a exemplary scenario not shown in FIG. 1, when the first camera 101 is a telephoto lens camera, and the second camera 102 is a wide FOV camera, the second image 112 may contain most or all the objects in the first image 111, plus additional objects not in the first image 111, due to the wide FOV property of the second camera 102.

As shown in FIG. 1, the first and second cameras 101 and 102 are positioned along a first direction 103 (also marked as direction D), which directly connects the first and second cameras 101 and 102. This first direction 103 is also known as a disparity direction, because it is along this direction 103 that the first and second images 111 and 112 are different in perspective, even though both images are taken of the same scene 110. A basic cause for this disparity is that there is a positional difference between the first and second cameras 101 and 102 along this first direction 103. There are several aspects to this disparity.

As an illustrative example for the first aspect of the disparity, the scene 110 includes scene objects 110A, 110B, 110C, 110D, and 110E, as shown in FIG. 1. Due to the first vantage point of the first camera 101, it takes the first image 111 that includes first image objects 111A, 111B, 111C, and 111E, which correspond to scene objects 110A, 110B, 110C, and 110E. Scene object 110D is not captured in the first image 111. On the other hand, due to the second vantage point of the first camera 102, it takes the second image 112 that includes second image objects 112A, 112B, 112C, and 112D, which correspond to scene objects 110A, 110B, 110C, and 110D. Scene object 110E is not captured in the second image 112. This type of disparity between the first and second images 111 and 112 primarily exists only along the first direction 103. This aspect of disparity may be rectified in a preliminary image processing step (disclosed later) by cropping the first and second images 111 and 112 to contain essentially the same objects in the first direction 103. As shown in FIG. 1, a first cropped (or roughly-aligned) image 113, which is cropped from the first image 111, contains essentially the same objects as a second cropped (or roughly-aligned) image 114, which is cropped from the second image 112. Cropping helps to render the first and second images 111 and 112 to be more similar to each other than their original raw forms. It is part of a rough alignment process.

In addition, there is another aspect of the disparity. More specifically, the relative spatial relationships between the image objects within the first and second images 111 and 112 are different. For example, both the scene objects 110A and 110B are present in the first image 111 as first image objects 111A and 111B, and are also present in the second image 112 as second image objects 112A and 112B. However, the spatial relationship between image objects 111A and 111B in the first image 111 appear to be different (in FIG. 1, they appear to be closer, for example) than the spatial relationship between image objects 112A and 112B in the second image 112. An exemplary reason of this aspect of disparity is parallax, which cannot be removed by cropping or other similar techniques.

In the example above, it is presumed that the first and second cameras 101 and 102 face directly forward toward the scene 110. In a different scenario not shown in FIG. 1, if the first camera 101 on the left side slants to the right side, and if the second camera 102 on the right side slants to the left side, then the scene objects captured by each camera will be different from the example in FIG. 1. A person of ordinary skill in the art will be able to appreciate this different scenario, and its ramifications with regard to the various aspects of disparity as disclosed above, hence further details of this scenario is not disclosed herein.

A second direction 104 (also marked as direction R) is orthogonal to the first direction 103. Along this orthogonal direction 104, there is no positional difference between the first and second cameras 101 and 102. Accordingly, between the first and second images 111 and 112, there is no disparity in the second direction 104. Therefore, the second, orthogonal direction 104 is not a disparity direction.

Preliminary Image Processing

After the first and second images 111 and 112 have been obtained by the first and second cameras 101 and 102, the two images may go through a preliminary processing step, which is based on a pre-shipping (or off-line) calibration process. More specifically, since the positions and the functionalities of the first and second cameras 101 and 102 are known, the pre-shipping calibration process may be engaged to utilize a calibration chart to obtain intrinsic and extrinsic matrices and distortion coefficients of the two cameras. This will help to rectify (e.g., cropping, as disclosed previously) the first and second images 111 and 112 in aspects such as having the same field of view, and also to roughly align them. However, even under the best circumstances, there will be post-shipping (or on-line) residual errors that occur when the first and second cameras 101 and 102 are being used to capture images in real usage. These residual errors may be due to exemplary causes such as open loop voice coil motor (VCM) inaccuracy, relative movement between the two cameras due to vibration, alterations to the camera performance due to usage, etc. The preliminary image processing based on the pre-shipping (or off-line) calibration process cannot correct for these post-shipping (or on-line) residual errors. Therefore, further image alignment after the preliminary image processing step is needed.

The preliminary image processing step includes several sub-steps. The goal is to achieve rough alignment of the first and second images, and prepare them for subsequent steps to further refine their alignment.

An exemplary preliminary processing step is disclosed herein. First, one or both of the images are cropped and/or zoomed based on pre-shipping (off-line) camera calibration data, so that they contain essentially the same objects. As an example, in FIG. 1, the first image 111 is cropped to produce the first cropped (or roughly-aligned) image 113 that includes the first image objects 111A, 111B, and 111C, which correspond to the scene objects 110A, 110B, and 110C, respectively. The second image 112 is cropped to produce the second cropped (or roughly-aligned) image 114 that includes the second image objects 112A, 112B, and 112C, which correspond to the scene objects 110A, 110B, and 110C, respectively. The first and second cropped (or roughly-aligned) images 113 and 114 therefore contain essentially the same objects. In the case (not shown in FIG. 1) where the first camera 101 is a telephoto lens camera (with a narrower viewing range), and the second camera 102 is a wide FOV camera (with a wider viewing range), the second image 112 (a wide FOV image containing more objects) is cropped so that it includes substantially the same objects as the first image 111 (a close-up telephoto image containing fewer objects). In a preferred embodiment, the first and second cropped (or roughly-aligned) images 113 and 114 are rendered to have essentially the same objects in the disparity direction 103. In contrast, there is more leeway in terms of image cropping in the orthogonal direction 104.

A zooming (or some other type of up or down sampling operation) operation may also be applicable in conjunction with cropping, in order to render the two roughly-aligned images 113 and 114 to have essentially the same scale, for the ease of subsequent operations. The zooming operation is appropriate in an exemplary situation where one camera is a telephoto lens camera, and the other camera is a wide FOV camera.

In the description above, it is presumed that the first and second cameras 101 and 102 face directly forward toward the scene 110. In a different scenario, if the first camera 101 on the left side slants to the right side, and if the second camera 102 on the right side slants to the left side, then the scene objects captured by each camera will be different from the example above. A person of ordinary skill in the art will be able to appreciate this different scenario, and its ramifications with regard to cropping and zooming. It is appreciated that the cropping-zooming operation of this scenario follows the same goal that both cropped-zoomed images will contain substantially the same objects, particularly in the disparity direction, as well as the same image scale.

In a second sub-step of preliminary image processing, the first and second roughly-aligned images 111 and 112, in case they are color images, are converted into monotone images. A color image may have several color channels, for example, red, green and blue channels. Converting a color image into a monotone image may be done in several ways. A first type of monotone image may be produced by taking the value of only one color channel, for example, the green channel (in part because human eye is most sensitive to green color). A second type of monotone image may also be produced by weighted averaging or summing the values of two or more color channels, for example, by weightedly averaging or summing the red, green, and blue channels (i.e., the red, green, blue channel may each have its own predetermined weight when they are being averaged or summed). This second type of monotone image is also known as a gray scale image, because it is essentially a black-and-white image with different shades of gray.

As a result of performing the preliminary processing step, the first and second images 111 and 112 are rendered as a first rough-aligned image 113 and a second roughly-aligned image 114. Both the first and second roughly-aligned images 113 and 114 have essentially the same objects due to cropping, particularly in the disparity direction 103. They may also have the same scale due to zooming (if needed). Preliminary processing helps to ensure that the first and second roughly-aligned images 113 and 114 have a format that is more suitable for the subsequent steps to further align them.

Image Alignment Using Feature Matching

Generally speaking, aligning two images may involve matching specific features (or feature points) between the two images. First, within a first image, an image feature (e.g., a feature descriptor, a feature point or pixel, etc.) is identified. This feature may be in the contextual format of an edge, a corner, a blob (region of interest points), a ridge, etc. Second, within a second image, a group of candidate features are identified. Each candidate feature must be of the same format (edge, corner, blob, ridge, etc.) and value as the first image feature. Significantly, this group of second image candidate features may be distributed throughout the second image. Lastly, a brute force matching (e.g., using k nearest neighbor, i.e., kNN algorithm) is performed to match the group of second image candidate features to the first image feature. Distances between the first image feature and each of the second image candidate features are computed and sorted. A best-matched pair is readily identified. This process is repeated several times to generate a multitude of best-matched pairs between the first and second images. Information from these best-matched pairs is then used to further align the two images.

Figure 2:
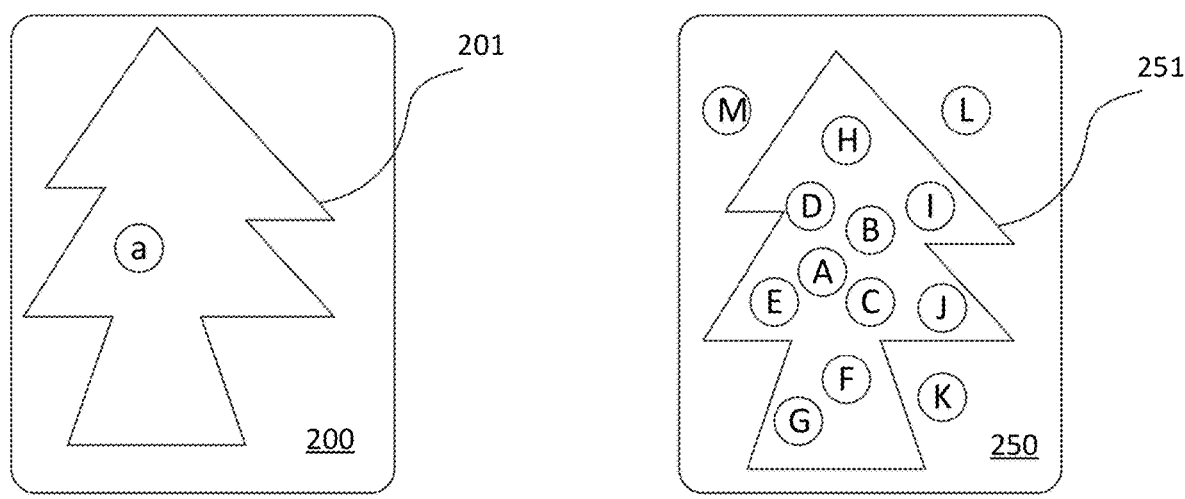
FIG. 2 is a diagram showing a first roughly-aligned image containing a single feature point, and a second roughly aligned image containing a group of candidate feature points throughout the image, wherein the candidate feature points may be used to match the feature point in the first roughly-aligned image.

FIG. 2 is a diagram that illustrates the aforementioned traditional brute force approach. A first image 200 originating from the first camera 101 (see FIG. 1) and a second image 250 originating from the second camera 102 (also see FIG. 1) are presented herein. Each image may be the result of the aforementioned preliminary image processing. Hence, both the first image 200 and the second image 250 may be roughly-aligned, monotone images, and are respectively exemplified by the first and second roughly-aligned images 113 and 114 in FIG. 1. The first roughly-aligned image 200 contains a first image object 201. A first image feature point or pixel, labeled as "a", is identified and shown within the first image 200. The second roughly-aligned image 250 contains a second image object 251. Both the first and second image objects 201 and 251 are renditions of the same scene object. Within the second image 250, a group of candidate feature points or pixels are labeled "A", "B", through "M", and are distributed throughout the second image 250 (a frequent occurrence). According to traditional brute force matching, each candidate feature point or pixel (A, B, through M) must be individually assessed, until a best-matched candidate is found. For example, first image feature point or pixel "a" and second image candidate feature point or pixel "B" may be deemed to be a best-matched pair.

This conventional brute force approach to align images is generally time consuming and computationally expensive, because distances between each feature point in the first image and each candidate feature point in the second image must be exhaustively calculated and sorted. For example, suppose there are 1000 feature points in the first image, and for each first image feature point, there are 2000 candidate feature points in the second image, then there needs to be two million (1000 times 2000) distance computations, plus associated sorting computations, in order to achieve the final matching result.

In a dual camera system, a first camera and a second camera are both pointing at the same scene. The distance separating the two cameras is generally small, for example, several centimeters apart. Each camera takes its image from its own unique vantage point, but vantage point difference between the two cameras is not very big. Therefore, a first camera image and a second camera image, although they are different, are not significantly different. For any feature point in the first camera image, there exists a best-matched candidate feature point in the second camera image, but this best-matched candidate feature point should exist within the vicinity of (i.e., not too far away from) the location of the first camera image feature point. Brute force matching of all candidate feature points throughout the entire second image is generally unnecessary and wasteful for this type of dual camera system. The current disclosure presents an approach that utilizes the fact that the two images produced by a dual camera system do not differ by too much. Compared with the conventional brute force approach, the current disclosure consumes much less time, and incurs much less computational cost.

Disparity Image Generation

Figure 3:
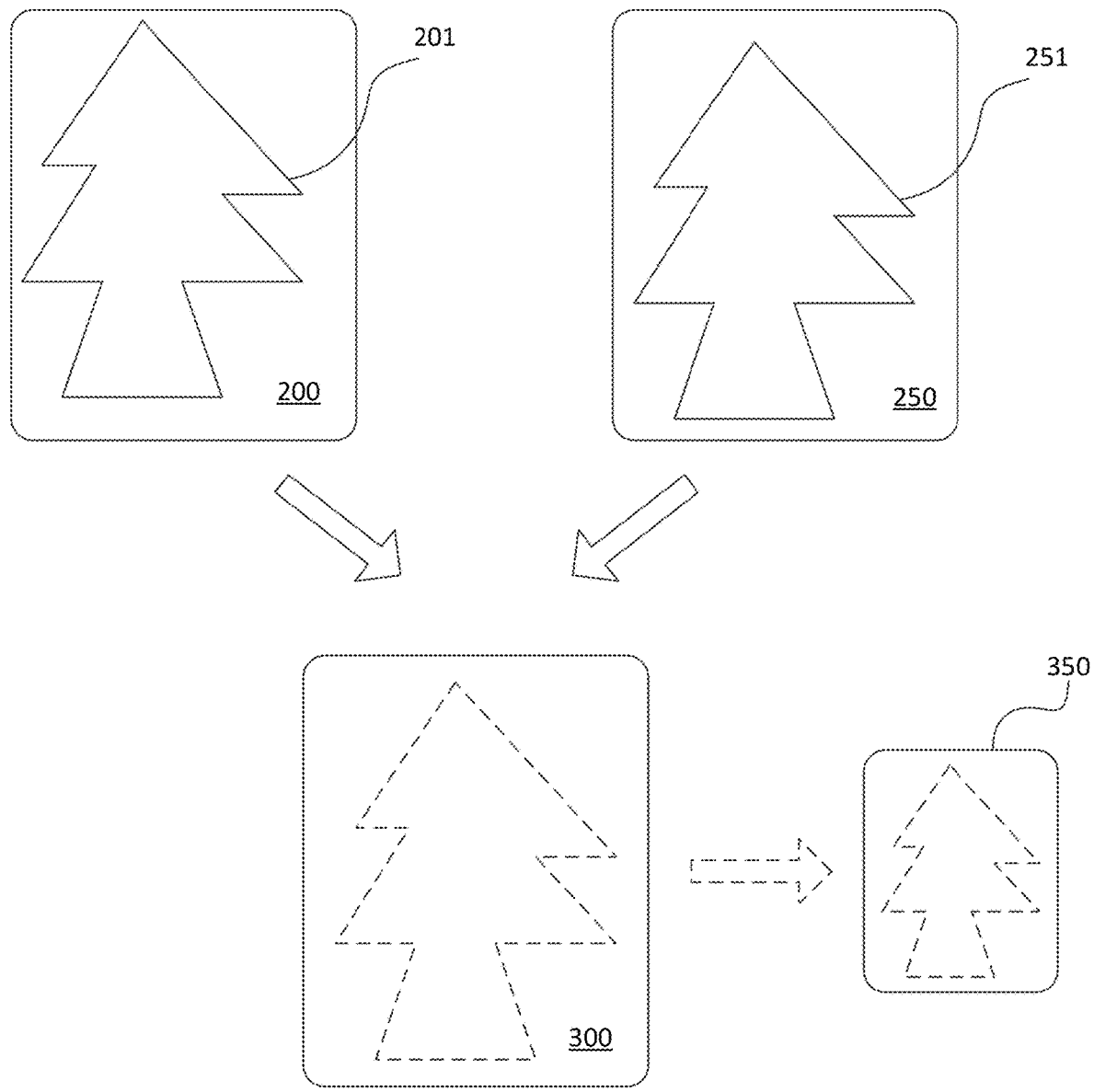
FIG. 3 is a diagram showing the utilization of the first and second roughly-aligned images to produce a disparity image.

A crucial aspect of the current disclosure is the generation of a disparity image from the first and second roughly-aligned images. FIG. 3 shows a first roughly-aligned image 200 and a second roughly-aligned image 250, both of which are being used to generate a disparity image 300. Various methods may be used to generate this disparity image 300, as one of ordinary skill in the art would appreciate. For example, a semi-global block matching method may be used. Generally speaking, these types of stereo matching methods compute the similarity between pixels by comparing windows around the pixels of interest. The disparity image 300 is alternatively known in the art as a depth map, for the following reason. Within the disparity image (or depth map) 300, each point or pixel has a disparity value, which is inversely related to the depth of that point in relation to the dual cameras. Parallax is more prominent when an imaged object is closer to the image sensors (e.g., dual cameras, eyes). More specifically, if a point of a scene object is close to the dual cameras, the disparity value due to the positional difference of the two cameras is more prominent (due to more parallax). If a point is far away from the dual cameras, the disparity value is less prominent (due to less parallax). Accordingly, the disparity value of each point in image 300 contains depth information.

The dotted outline in the disparity image 300 represents the general contour and shading of a disparity image (depth map). It is not an exact rendition of the image objects 201 and 251. Rather, as we use different shades of gray to represent the disparity value at each point of the image 300, with higher value represented by a darker gray shade (or a lighter shade, depending on choice of convention), the overall contour and shading of image 300 will manifest a similar shape outline as image objects 201 and 251 of the roughly-aligned imaged 200 and 250.

Several issues are worth further elaboration. First, according to FIG. 1, the first camera 101 and the second camera 102 are positioned along the first direction 103, which in this case is the horizontal direction (or x direction). This is also the disparity direction. Accordingly, the disparity value at each point of the disparity image 300 is denoted as $\Delta x$, which indicates an image disparity in the x direction as caused by the positional difference between the two cameras 101 and 102. Second, there is no disparity value in the second direction 104 (see FIG. 1), because there is no positional difference between the first and second cameras 101 and 102 in this second direction (y direction) that is orthogonal to the x direction. Third, as an optional step, the disparity image (or depth map) 300 may be down-sampled in order to speed up the subsequent calculation when this image is being used to create a search zone. For example, a 2:1 down-sampling in both the rows and the columns of the image 300 may result in a quarter-resolution, down-sampled disparity image 350, as shown in FIG. 3.

Identifying a Feature Point and a Group of Candidate Feature Points

Another crucial aspect of the current disclosure is selecting feature points in the first and second roughly-aligned images 200 and 250, and identifying best-matched pairs between these two sets of feature points. Further details are disclosed in the following.

Figure 4:
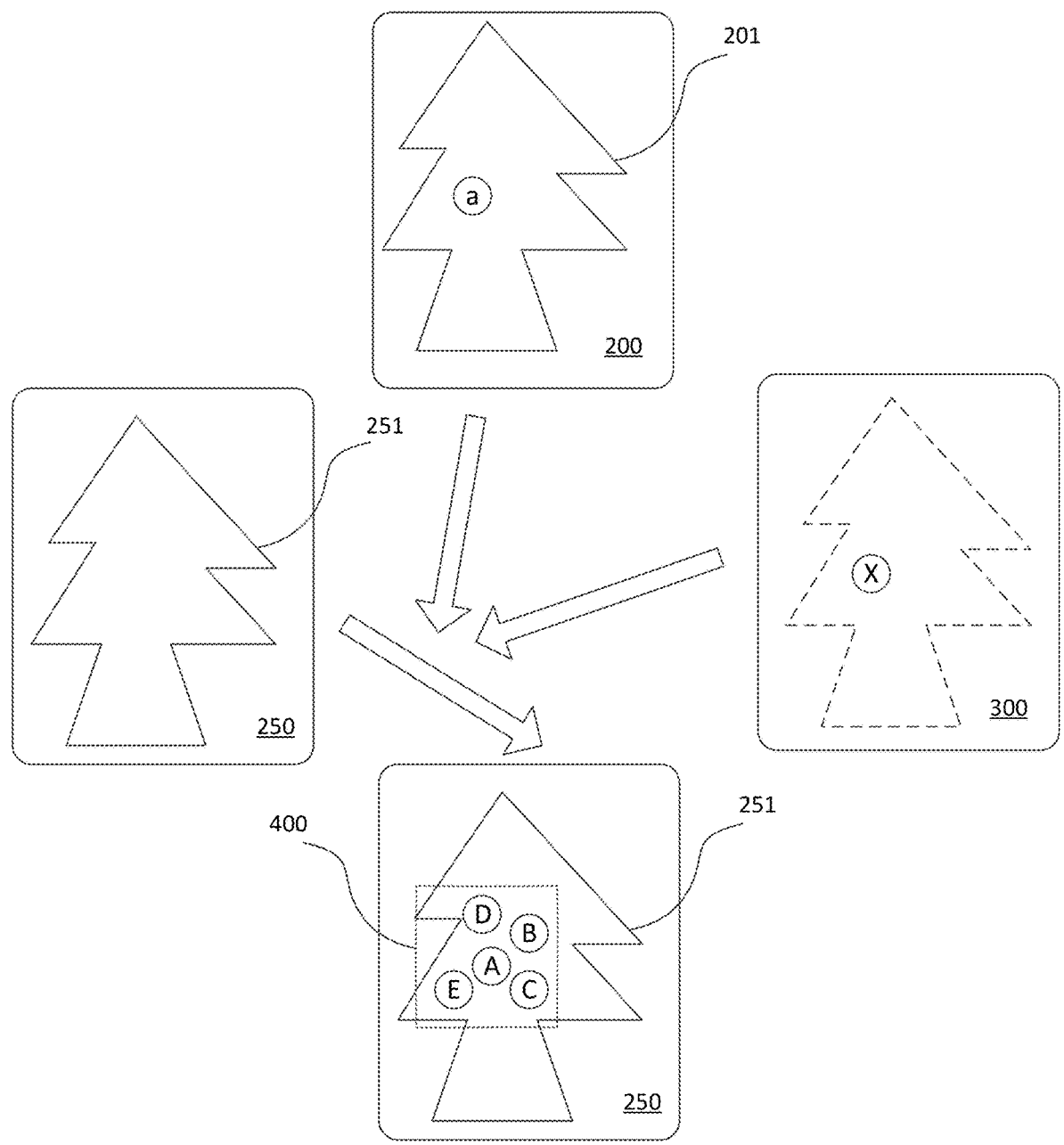
FIG. 4 is a diagram showing the utilization of the disparity image to form a search zone within the second image, wherein the search zone contains a group of candidate feature points that may be used to match the feature point in the first roughly-aligned image.

First, as shown in FIG. 4, a first image feature "a" is identified in the first roughly-aligned image 200. This may be a feature point, pixel, or some other type of descriptor. Several such features may be identified in the entire process. For the sake of simplicity in illustration, only one such first image feature "a" is discussed, and is hereinto regarded as one feature point. A number of selection criteria may be applied to select the first image feature point "a". For example, an edge, a corner, a ridge, etc., may be considered in selecting the first image feature point "a". For the sake of illustration, the position of this feature point "a" in image 200 may be represented by an ordered pair Cartesian system notation $(x_a, y_a)$.

Second, also shown in FIG. 4, a disparity image (depth map) 300 is considered in conjunction with the first image feature point "a" in order to identify an associated disparity value. A down-sampled disparity image 350 (see FIG. 3) may be similarly used (e.g., after same-resolution up-sampling) as the disparity image 300. As previously explained, the disparity image 300 contains disparity information that is denoted as $\Delta x$, which indicates an image disparity only in the x direction as caused by the positional difference between the two cameras 101 and 102. In the current example, within the disparity image 300, a point position represented by "X" has the same location $(x_a, y_a)$ as point "a" within the first roughly-aligned image 200. At point "X" within the disparity image 300, the specific disparity value associated with $(x_a, y_a)$ may be looked up. This is the associated disparity value that will be useful in the next step. This disparity value may be denoted as $\Delta x_a$, and is alternatively referred to as a depth vector. It is appreciated that there is no disparity value in the y direction, because there is no positional difference between cameras 101 and 102 in the y direction 104 (see FIG. 1).

Third, the first image feature point position $(x_a, y_a)$ and its associated disparity value $\Delta x_a$ may be combined to create a new position $(x_a+\Delta x_a, y_a)$ that will serve as the center of a search zone (or search window) 400 within the second roughly-aligned image 250, as shown in FIG. 4. This search zone (or search window) 400 is sometimes referred to as a geometric prior. Its shape may be rectangular, or some other shapes (such as some regular polygonal shape, or a circle). When the search zone is a rectangle, it may have a size of m by n, wherein m and n represent number of pixels. For example, both m and n may be 41 pixels.

Fourth, as shown in FIG. 4, within the search zone 400 of the second roughly-aligned image 250, a group of candidate feature points "A", "B", through "E" may be identified. Each of these candidate feature points will then be individually assessed to match the first image feature point "a". Since the search zone 400 is much smaller than the entire image 250, e.g., 41×41 pixels (search zone) vis-à-vis 1080×1440 pixels (entire image), the number of candidate feature points within the search zone is significantly less. This may be exemplarily appreciated by comparing FIGS. 2 and 4. In FIG. 2, there are many candidate feature points (A, B, through M) within the entire roughly-aligned image 250. In contrast, in FIG. 4, there are fewer candidate feature points (A, B, through E) within the search zone 400, which is itself contained within the second roughly-aligned image 250. The reduction of candidate feature points (usually on the order of 100 times or more) is a key reason for the time and computational cost saving of the image alignment system of the current disclosure.

Identifying the Best Candidate Feature Point to Match the Feature Point

Subsequently, a local brute force matching may be performed to compare each candidate feature point (A, B, through E) within the search zone 400 with the first image feature point "a". For example, a kNN algorithm may be employed. Distances between the feature point "a" and each candidate feature point (A, B, through E) may be computed and sorted. A best-matched pair may be identified accordingly. For the sake of illustration, suppose candidate feature point "B" is best matched to the feature point "a". Then the best-matched pair information would include the Cartesian notation $(x_a, y_a)$ and $(x_B, y_B)$ of these two points.

The aforementioned process may be repeated several times to identify more best-matched pairs. For each time of the repetition, a feature point is identified within the first image 200; an associated, corresponding disparity value is identified with the help of the disparity image 300; a search zone 400 is created accordingly within the second image 250; a group of candidate feature points are identified within this search zone 400; and a local brute force matching is employed to identify a best-matched pair.

Modeling and Rectification Operations

After local matching, a list of best-matched pairs will be identified. Information contained in these best-matched pairs may then be used to further align the first and second roughly-aligned images 200 and 250. A number of rectification models may be employed, as appreciated by one of ordinary skill in the art. As an example, an affine model with scaling parameter and shift parameter may be used in the modeling. In addition, based on an online calibration model, linear interpolation may be used to rectify one or both of the images. The end result is to produce the first and second processed images 661 and 662, as previously shown in FIG. 6. These images are now better aligned with each other, and are suitable for further information extraction and/or image processing, such as depth perception, dynamic zooming, etc.

Exemplary Image Signal Processing Operation Flow

An exemplary image signal processing operation flow is disclosed herein to restate and emphasize some aspects of the image processing embodiments as described above. This is shown in FIG. 5, wherein each rectangular block stands for a processing block, and each rounded rectangle stands for a data form, such as an image, a value, a search zone, a feature point, a pair of matched feature points, etc.

Figure 5:
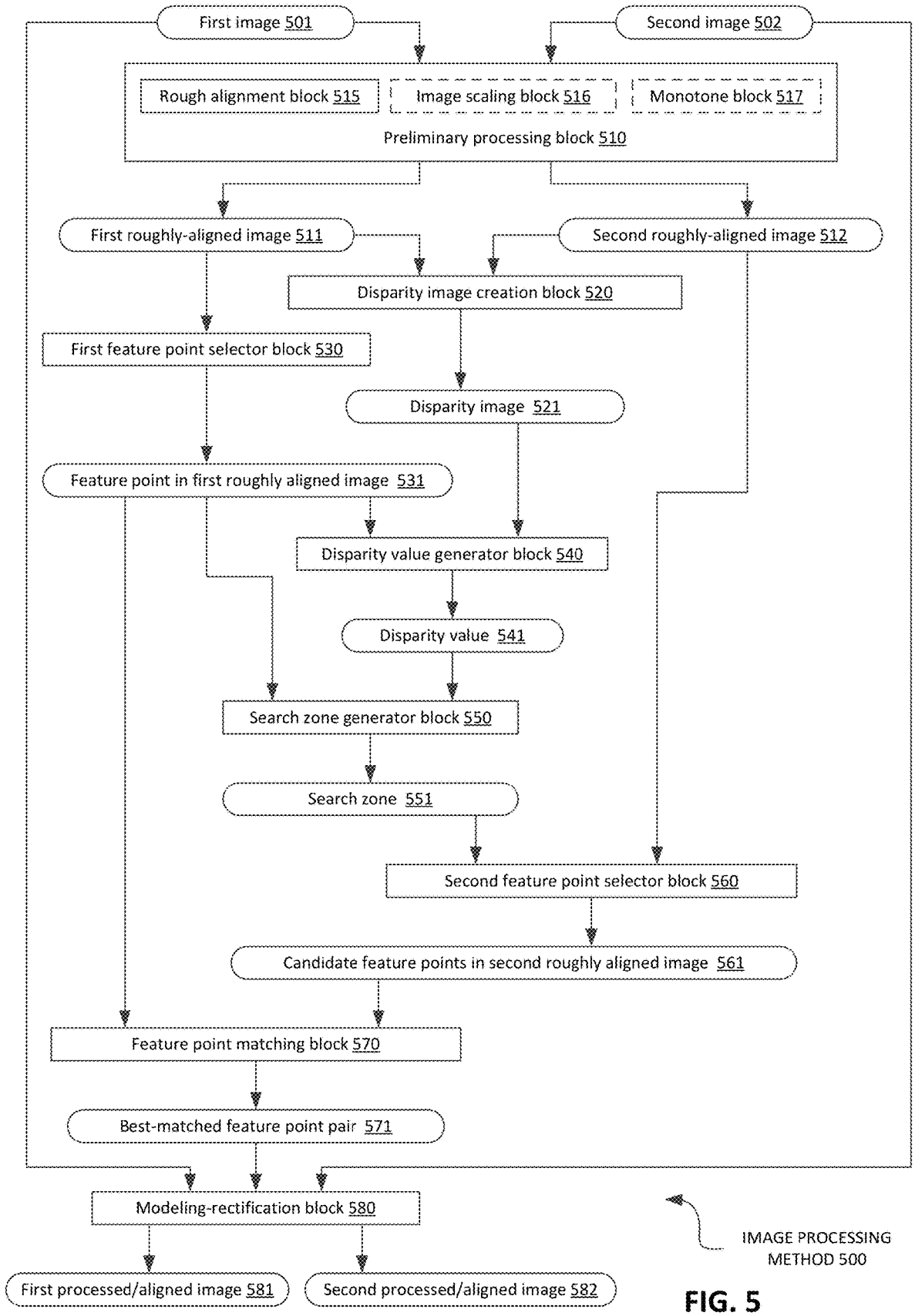
FIG. 5 is a flow chart showing a multitude of digital image signal processing blocks and their operations within an image signal processor (ISP) of a multiple camera imaging system.

As shown in FIG. 5, an image processing method 500 starts with using a first and second image sensor cameras to obtain, from different perspective vantage points, a first image 501 and a second image 502, and sending both images to a preliminary processing block 510. The preliminary processing block 510 performs several tasks: (1) selective cropping based on pre-defined, intrinsic and extrinsic camera properties (position, field of view, magnification, etc.), as performed by a mandatory rough alignment block 515; (2) optional zooming operation as needed, as performed by an optional image scaling block 516; and (3) optional conversion from color to monotone as needed, as performed by an optional monotone block 517. As a result, the preliminary processing block 510 produces a first roughly-aligned image 511 and a second roughly-aligned image 512. It is noteworthy that the first and second cameras are positioned along a disparity direction, such as the x direction. In FIG. 1, this disparity direction is exemplarily represented as the horizontal direction 113. There is no disparity in the y direction 114, which is orthogonal to the horizontal direction 113, as shown in FIG. 1.

These two roughly-aligned images are then sent to a disparity image creation block 520, which produces a disparity image (or depth map) 521. Methods such as semi-global block matching may be used to create the disparity image 521. It is noteworthy that the disparity image 521 contains disparity information only in the disparity direction, such as the x direction. In the orthogonal y direction, there is no disparity information.

A first feature (or feature point) selector block 530 may be used to select a first image feature point 531 within the roughly-aligned image 511. This first image feature point 531 may have an exemplary position at $(x_a, y_a)$. Also, the same position is found within the disparity image 521, and an associated disparity value (depth vector) 541 is looked up. For example, the disparity value 541 may be represented as $\Delta x_a$. This step is performed by a disparity value generator block 540. Next, the position of the first image feature point 531 $(x_a, y_a)$ may be combined with the disparity value $\Delta x_a$ to generate the center position $(x_a+\Delta x_a, y_a)$ of a search zone (or search window) 551. This step is performed by a search zone generator block 550. The search zone 551 is also known as a geometric prior, and covers an area that is much smaller than the second roughly-aligned image 512. For example, the search zone 551 may be 41×41 pixels, whereas the entire second roughly-aligned image 512 may be 1080× 1044 pixels.

A second feature (or feature point) selector block 560 selects a group of candidate feature (or feature points) 561 from within the second roughly-aligned image 512. Crucially, this group of candidate feature points 561 is selected only from the search zone 551, which is itself positioned inside the second roughly-aligned image 512. The center of the search zone 551 is at $(x_a+\Delta x_a, y_a)$.

A feature point matching block 570 takes the first image feature point 531 and the group of second image candidate feature points 561, and uses local matching (such as kNN brute force matching) to identify a best-matched candidate feature point. These two feature points form a best-matched feature point pair 571.

The process performed by blocks 530, 540, 550, 560, and 570 may be repeated several times in order to identify a multitude of best-matched feature point pairs.

The information contained within these best-matched feature point pairs is then aggregated and sent to a modeling-rectification block 580, which may itself include model estimator operation and rectification/interpolation sub-blocks (not shown). As an example, the modeling-rectification block 580 may use interpolation to refine one or both of the two roughly-aligned images. For example, the second roughly-aligned image 512 is further aligned with the first roughly-aligned image 511. The end result is a first processed image 581, and a second processed image 582 that is aligned with the first processed image 581. The two better aligned images 581 and 582 may then be used for further information extraction and/or image processing, such as depth perception, dynamic zooming, etc.

Compared with the conventional image processing that uses brute force to match all the key feature points within both images, the aforementioned approach of utilizing a disparity image (depth map) is much less costly, in terms of hardware complexity and processing speed. Experiments have shown that whereas the conventional method requires more than 68 milliseconds to obtain the appropriate affine model (before the final two-dimensional image alignment), the currently disclosed method only requires about 23 milliseconds. Hardware complexity in terms of buffer size is also reduced.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A multiple camera imaging system, comprising:
   a first camera image sensor configured to obtain a first image of a scene from a first vantage perspective point;
   a second camera image sensor configured to obtain a second image of the scene from a second vantage perspective point; and
   an image signal processor (ISP), configured to process the first image and the second image by performing the following steps:
   (a) producing a first roughly-aligned image from the first image, and a second roughly-aligned image from the second image, by a rough alignment operation comprising one of cropping and scaling;
   (b) using the first and second roughly-aligned images to produce a disparity image, wherein each pixel of the disparity image has a disparity value;
   (c) identifying a feature point within the first roughly-aligned image;
   (d) identifying a disparity value associated with a position in the disparity image, wherein the position in the disparity image is same as a position of the feature point within the first roughly-aligned image;
   (e) creating a center of a search zone within the second roughly-aligned image, wherein the center of the search zone is a combination of the position of the feature point within the first roughly-aligned image and the associated disparity value;
   (f) creating the search zone having a size of m by n pixels, wherein the size of m by n pixels is smaller than the entire second roughly-aligned images;
   (g) identifying a group of candidate feature points within the search zone;
   (h) identifying within the search zone a best-matched candidate feature point that best matches the feature point within the first roughly-aligned image to form a best-matched feature point pair; and
   (i) using information from the best-matched feature point pair to further align the first and second roughly-aligned images;
   wherein the first camera sensor and the second camera sensor are positioned along a first direction; wherein the first direction is perpendicular to a second direction; and wherein the disparity image includes disparity information only in the first direction; and
   wherein step (b) further includes the ISP down-sampling the disparity image to produce a lower-resolution disparity image, and wherein step (c) further includes the ISP utilizing the lower-resolution disparity image to create the search zone within the second roughly-aligned image.

2. The multiple camera imaging system of claim 1, wherein one of the first and second camera sensors is configured to have a wider viewing range than the other camera sensor.

3. The multiple camera imaging system of claim 1, wherein the first and second images are color images that include a multitude of color channels, and wherein step (a) further includes the ISP averaging the multitude of color channels of the first and second images to produce the first and second roughly-aligned images.

4. The multiple camera imaging system of claim 3, wherein step (a) further includes the ISP using cropping to produce the first and second roughly-aligned images, wherein the second roughly-aligned image has substantially the same objects as the first roughly-aligned image.

5. The multiple camera imaging system of claim 1, wherein the ISP repeats steps (c) and (d) to form a multitude of best-matched feature point pairs, and wherein step (e) includes using information from the multitude of best-matched feature point pairs to further align the first and second roughly-aligned images.

6. A method of digital image signal processing, comprising:
   (a) providing a multiple camera imaging system including a first camera sensor, a second camera sensor, and an image signal processor (ISP);
   (b) using the first camera sensor to obtain a first image of a scene from a first vantage perspective point; using the second camera sensor to obtain a second image of the scene from a second vantage perspective point;
   (c) using the ISP to produce a first roughly-aligned image from the first image, and a second roughly-aligned image from the second image, by a rough alignment operation comprising one of cropping and scaling;
   (d) using the ISP to utilize the first and second roughly-aligned images to produce a disparity image, wherein each pixel of the disparity image has a disparity value;
   (e) using the ISP to identify a feature point within the first roughly-aligned image;
   (f) using the ISP to identify a disparity value associated with a position in the disparity image, wherein the position in the disparity image is same as a position of the feature point within the first roughly-aligned image;

(g) using the ISP to create a center of a search zone within the second roughly-aligned image, wherein the center of the search zone is a combination of the position of the feature point within the first roughly-aligned image and the associated disparity value;

(h) using the ISP to create the search zone having a size of m by n pixels, wherein the size of m by n pixels is smaller than the entire second roughly-aligned images;

(i) using the ISP to identify a group of candidate feature points within the search zone;

(j) using the ISP to identify within the search zone a best-matched candidate feature point that best matches the feature point within the first roughly-aligned image to form a best-matched feature point pair; and (k) using the ISP to utilize information from the best-matched feature point pair to further align the first and second roughly-aligned images;

wherein the first camera sensor and the second camera sensor are positioned along a first direction; wherein the first direction is perpendicular to a second direction; and wherein the disparity image includes disparity information only in the first direction; and wherein step (d) further includes the ISP down-sampling the disparity image to produce a lower-resolution disparity image, and wherein step (e) further includes the ISP utilizing the lower-resolution disparity image to create the search zone within the second roughly-aligned image.

7. The digital image signal processing method of claim 6, wherein one of the first and second camera sensors is configured to have a wider viewing range than the other camera sensor.

8. The digital image signal processing method of claim 6, wherein the first and second images are color images that include a multitude of color channels, and wherein step (c) further includes the ISP averaging the multitude of color channels of the first and second images to produce the first and second roughly-aligned images.

9. The digital image signal processing method of claim 8, wherein step (c) further includes the ISP using cropping to produce the first and second roughly-aligned images, wherein the second roughly-aligned image has substantially the same objects as the first roughly-aligned image.

10. The digital image signal processing method of claim 6, wherein the ISP repeats steps (e) and (f) to form a multitude of best-matched feature point pairs, and wherein step (g) includes the ISP using information from the multitude of the best-matched feature point pairs to further align the first and second roughly-aligned images.

* * * * *